United States Patent [19]

Wallace

[11] 4,059,136
[45] Nov. 22, 1977

[54] THREAD LOCK

[75] Inventor: Richard B. Wallace, Bloomfield Hills, Mich.

[73] Assignee: The Oakland Corporation, Troy, Mich.

[21] Appl. No.: 701,107

[22] Filed: June 30, 1976

Related U.S. Application Data

[63] Continuation-in-part of Ser. No. 550,831, Feb. 18, 1975, abandoned.

[51] Int. Cl.² .............................................. F16B 39/02
[52] U.S. Cl. .................................. 151/14.5; 118/204; 118/227; 427/410; 427/428
[58] Field of Search .................... 151/14.5, 7; 85/1 C, 85/10 F; 118/204, 227, 224; 427/410, 333, 428, 358, 386

[56] References Cited

U.S. PATENT DOCUMENTS

| 2,185,088 | 12/1939 | Kronquest | 427/428 X |
|---|---|---|---|
| 2,555,536 | 6/1951 | Faeber | 427/428 X |
| 2,884,896 | 5/1959 | Thayer | 118/227 X |
| 3,061,455 | 10/1962 | Anthony | 151/7 X |
| 3,104,182 | 9/1963 | Schneider et al. | 118/204 |
| 3,410,713 | 11/1968 | Schneidereit | 118/204 X |
| 3,485,132 | 12/1969 | Hanny et al. | 85/1 C |
| 3,669,738 | 6/1972 | Cottis et al. | 427/358 X |

FOREIGN PATENT DOCUMENTS 945,669  1/1964  United Kingdom ................ 151/14.5

Primary Examiner—Ramon S. Britts
Attorney, Agent, or Firm—Whittemore, Hulbert & Belknap

[57] ABSTRACT

Thread locking structure in which the separate fluid parts of a two-part adhesive (such as an epoxy resin and an activator) are applied in circumferentially related relation to the threads of a threaded member such as a bolt. At least one pair of adjacent edges of the deposits are in contact and the parts are covered with a single protective sealing film such for example as polyvinyl alcohol. When the companion threaded member is engaged, the two parts of the adhesive are intermingled mechanically and the setting up of the adhesive is initiated.

14 Claims, 4 Drawing Figures

FIG. 1
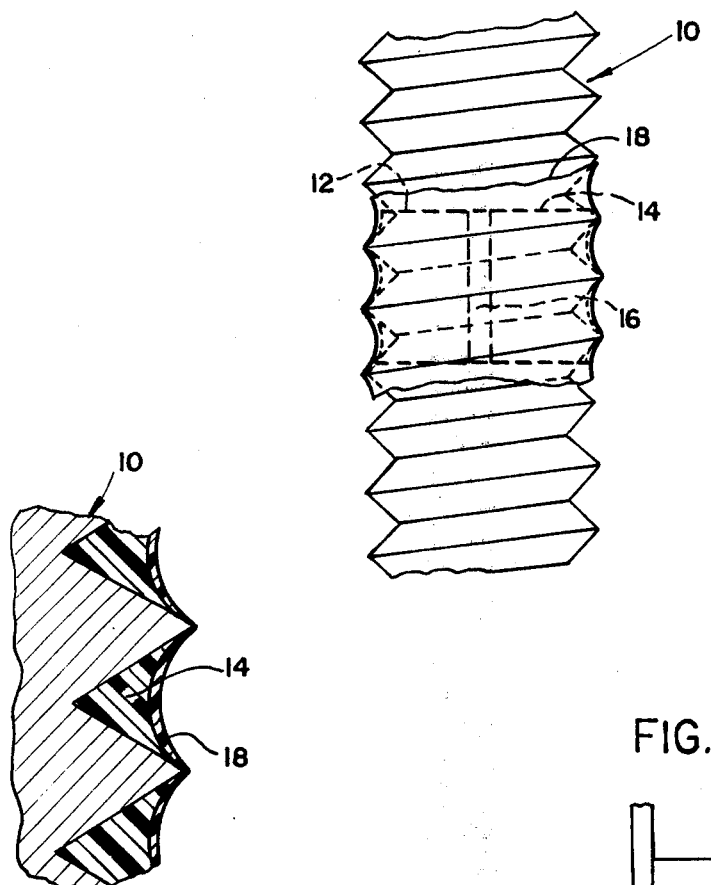
FIG. 4
FIG. 2
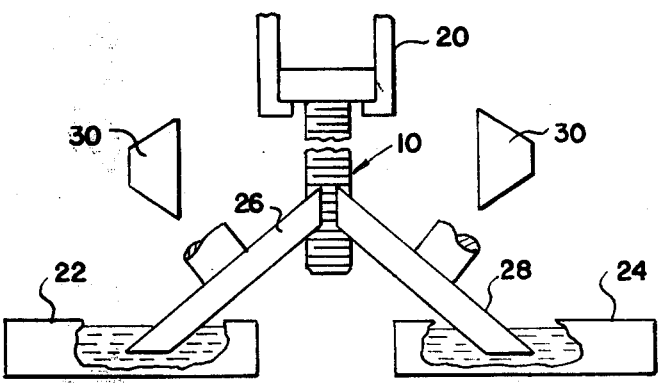
FIG. 3
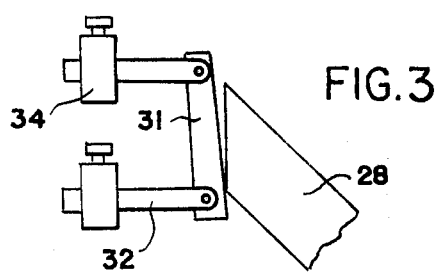

THREAD LOCK

CROSS-REFERENCE TO RELATED APPLICATIONS

The present application is a Continuation-in-Part of prior copending application Ser. No. 550,831, filed Feb. 18, 1975, now abandoned.

BRIEF SUMMARY OF THE INVENTION

The simple form of the invention is the application of a multiple part, preferably a two-part, adhesive to the threads of an external threaded member such as a bolt to produce a novel self-locking device. In a typical example the two-part adhesive is essentially an epoxy resin in uncured fluid condition, and the other part of the adhesive is the activator which is also applied and preferably remains in a fluid condition.

The individual parts of the multiple adhesive are applied in circumferentially related relation to a threaded portion of the bolt or other body. In a simple form of the invention each constituent of the two-part adhesive occupies approximately 180° around the threaded portion, the edges of each deposit of the adhesive material abutting. It has been found that where an edge of the resin deposit in a thread groove abuts the edge of a deposit of the activator in the thread groove, the activator and resin react to set up a narrow barrier zone which prevents further reaction between the activator and resin. The reacted resin and activator form a solid product which assists in mechanically mixing the resin and activator when the threaded members are engaged.

The resin and activator are applied in fluid form and at least one constituent remains in fluid form. It is accordingly necessary to protect the fluid deposit so as to provide treated bolts or the like which may be intermingled without adhering together. This is readily accomplished by providing a very thin protective film over the deposits of the two-part adhesive. Such a film for example, may be provided by a water-based solution of polyvinyl alcohol (PVA) which may be applied in a spray form or by dipping, followed by a drying operation in which the polyvinyl alcohol becomes a thin non-tacky protective sealing film.

In use, as the companion threaded member, such for example as a nut, is threaded over the zone provided with the deposits of the two-part adhesive, the protective film is ruptured and the fluid resin or other adhesive is caused to be instantly intermingled with the activator so that setting up of the adhesive is initiated. This action is improved by the presence of the solid reaction product between the resin and activator.

The present thread lock may conveniently be produced by advancing a multiplicity of threaded members such as bolts along a conveyor with the axes of the threaded portions vertical. Applicators in the form of frusto-conical members are rotated adjacent the path of advance and at the lower portion thereof the frusto-conical applicators are caused to dip into a supply of the fluid adhesive or activator. At the upper portion of the applicator the frusto-conical surface is vertical and applies the adhesive or activator by a wiping action. The material of the applicator may be relatively soft such for example as a pile material, a sponge, or the like, so that the adhesive and applicator may be applied over a substantial angular zone up to approximately 180°, thus providing complete coverage of the threaded portion of the bolt and bringing the edges of the thin deposits of fluid material into contact with each other.

In order to assist in depositing the adhesive and activator, the members are initially heated, as for example, to about 180° F. This helps to cause the resin adhesive and activator to flow so that the edges of the deposit meet. The heating may conveniently be accomplished by advancing the articles between rows of heating elements, and the heating continued after deposit of the materials, so as to accelerate drying of the subsequently applied protective coating.

Thereafter, a protective coating is applied over the deposits. This may be accomplished by providing a thin spray coating of polyvinyl alcohol (PVA) and due to the elevated temperature of the body and deposits, the PVA dries rapidly to provide a protective sealing non-tacky film.

Instead of applying the PVA as a spray coating, the threaded member on which the adhesive components are provided, may be dipped into a bath containing the PVA solution.

BRIEF DESCRIPTION OF THE DRAWING

FIG. 1 is an enlarged view illustrating a portion of an externally threaded member provided with two or more components of a multiple-part adhesive and covered with a protective film.

FIG. 2 is a diagrammatic view illustrating a preferred mode of application of the adhesive and activator to threaded members.

FIG. 3 is a diagrammatic view illustrating the use of a doctor blade with the applicator rolls.

FIG. 4 is an enlarged sectional view through a deposit in a thread groove.

DETAILED DESCRIPTION

Referring now to the drawings, in FIG. 1 there is shown a threaded member 10 which may be in the form of a bolt, on which a plurality of deposits 12 and 14 of a multiple-part adhesive are applied. Preferably, the two parts of the adhesive each occupy substantially 180° of the threaded member, and accordingly the edges of the deposits 12 and 14 are in contact. Where the edge of the deposit of the activator, which may be the deposit 12, contacts the edge of the deposit of the adhesive, which may be the deposit 14, there is an interaction providing a relatively narrow zone 16 which constitutes a barrier against further reaction between the adhesive and actuator. This reaction is self-limiting, and results in very thin barriers, which being solid break up into mechanical mixing elements when the threaded parts are set up.

Overlying the deposits 12 and 14 is a protective film 18 which may be in the form of a dried film of polyvinyl alcohol (PVA), which may be of a thickness as small as 0.0005 to 0.0015 inch, as best illustrated in the enlarged fragmentary section of FIG. 4.

The precise materials making up the parts of the two-part adhesive may be selected from known adhesives and activators. By way of example, the adhesive may be in the form of a well-known epoxy adhesive in fluid condition, applied to the threaded member 10 to form a deposit in the thread groove which may fill the thread groove to a depth of from ¼ to as much as 90%. Similarly, the activator for the adhesive may be in the form of any well known epoxy activator, preferably provided in fluid form, and applied to form a deposit in the thread grooves of comparable depth.

After the adhesive and activator or other parts of a multiple adhesive are applied and while they remain in fluid condition, the covering which may be polyvinyl alcohol, is applied in the form of a spray or a coating resulting from immersion of the article.

In use, as the mating threaded member is threaded onto the threaded body 10, the mechanical engagement of the threads of the companion member ruptures the thin protective film 18 and produces intimate mechanical intermingling between the resin and activator or other components of the multiple-part adhesive. This immediately initiates setting up or hardening of the adhesive very rapidly and ultimately produces a secure interlock between the threaded members.

Referring now to FIG. 2 there is illustrated a preferred method of producing the thread lock construction. Here, a series of threaded members such as the bolts 10 are advanced by suitable conveying means diagrammatically indicated at 20 with the axes of the threaded members 10 extending vertically. Adjacent the path of advance of the threaded members 10 are provided reservoirs 22 and 24 which contain supplies of the two parts of the two-part adhesive such for example as the epoxy adhesive and activator. Associated with the reservoirs 22 and 24 are applicator rollers 26 and 28 the peripheral portions of which are frusto-conical in shape as illustrated. The material of the applicators may be relatively soft such for example as deep pile, a spongy construction, or the like, so that the peripheral portion thereof contacting the threaded portion of the threaded member may be distorted to extend around a desired angular extent of the threaded member. For example, in an extreme case each applicator 26, 28 may apply its adhesive component to approximately 180° of the threaded portion.

It will of course be observed that the zones contacted by the applicators 26 and 28 are diametrically opposite each other so that in the finished product, the deposits illustrated at 12 and 14 in FIG. 1 are circumferentially related.

The fluid adhesive components in the reservoirs 22 and 24 are applied to the members while at an elevated temperature, as for example 180° F. For this purpose the threaded members are advanced through a heating zone characterized by heating elements 30 designed to produce the desired temperature. This of course raises the temperature of the threaded member and conditions it for most efficient operation during the deposit of adhesive and activator.

A very thin sealing protective film is then applied to overlie the deposits 12 and 14. Conveniently, this may be accomplished by providing fine spray elements at opposite sides of the conveyor adapted to deposit a continuous thin film of a sealing member such as polyvinyl alcohol to completely cover the deposits 12 and 14. Since the threaded members at this time are at an elevated temperature, deposition of the thin spray of film forming material is followed immediately by drying of the film to a solid non-tacky protective film which permits the parts to be intermingled at random without adhering together. At the same time the thin protective film is readily ruptured by the simple application of the threaded part to a mating member.

It will be noted that the deposits 12 and 14 are shown as spaced from the lower end of the member 10. However, this is not essential, and represents a valuable feature of the present invention.

Since the materials are in fluid form, they introduce no appreciable friction torque and in fact, may act as a lubricant. Accordingly, the deposits may extend to the very end of the threaded member. It is noted that in no case do the deposits extend beyond the O.D. of the threads.

Referring now to FIG. 3 there is illustrated a fragmentary diagrammatic view showing the use of a doctor blade 31 adjacent the edge of an applicator roll 28 so as to provide for a thickness of deposit which is variable. For this purpose the doctor blade 31 is illustrated as carried by adjustable arms 32 each of which is adjustable in a support clamp 34. With this arrangement, it is possible to apply a deposit to a vertically elongated zone at one side of a threaded member 10 which is of variable thickness vertically. As illustrated, a heavier deposit of the adhesive (either the resin or the activator) is applied at the upper portion of the zone to which the fluid adhesive is applied. The fluid material, after deposit by the roller onto the threads of the member, flows downwardly and around the threads. By properly selecting the angularity and spacing of the doctor blade 31 from the periphery of the applicator roll 28, each deposit may be made to assume uniform thickness after deposit.

In the past it has been proposed to use micro-encapsulated epoxy adhesives and activators but these have required a "bedding" compound for the capsules as a result of which torques of 10–30 inch-pounds as in the case of ⅜ inch diameter threads, have been required to engage the mating threaded elements. In the present case the adhesive deposits are in the form of viscous liquids opposing only negligible torques to engagement of the threaded parts, thus providing a very favorable torque-tension ratio.

The unusual thinness and toughness of the polyvinyl alcohol film permits the use and ultimate "dry" handling and boxing of such soft and flowable coating materials. It is apparently also effective to produce an extrusion effect in which a mixing process between the resin and activator takes place at the first encroachment of the mating thread and before the PVA is torn, which is apparently no later than the second half turn of engagement. The torn segments of the PVA coating continue the mechanical mixing during relative rotation of threaded parts, and the ruptured barrier portions act in the same way.

While the specific disclosure in the foregoing contemplates the provision of each deposit of the two-part adhesive to probably approximately 180° in the same circumferentially related zone, it will of course be apparent, particularly where large diameter parts are provided, that a multiplicity of separated zones of each of the components of the adhesive may be arranged intermediate a final multiplicity of circumferentially related zones of the other component.

Where, for example, a large threaded member is to be applied with a plurality of deposits of the same adhesive component, this may be accomplished in two steps by providing at diametrically opposite, angularly limited zones deposits of the same material by the operation illustrated in FIG. 2. Thereafter, the threaded elements may be rotated 90° and advanced between a second pair of applicators which will apply the second component of the adhesive to the zones intermediate the deposits previously applied.

It is of course possible to provide one of the adhesive components over more than 180°, with a second component disposed between the circumferentially spaced edges thereof.

Reference is made to U.S. Pat. No. 3,814,156 which discloses several different multiple-part adhesives which may be used in the practice of the present invention.

While the disclosed circumferentially adjacent deposits illustrated and described is preferred, it will be understood that axially adjacent deposits may be employed. Alternatively, each deposit may be applied in a spiral. In all cases at least one, and preferably two, pair of adjacent deposit edges are in contact, with a barrier formation resulting from the interaction between the adhesive parts.

The solid barrier produced by the reaction between the resin and activator is of course identical with the material resulting from the reaction between these materials after intermixture thereof caused by the threading together of the mating threaded members. The barrier breaks up into solid fragments which are mechanically moved relative to one or both of the thread surfaces of the members, and act to increase the thoroughness of the mixing thereof. In the final set condition, the fragments, being identical in physical properties with the reacted resin and activator, and being firmly bonded into the reacted mixture, simply form a part of the frictional connection and contribute to the frictional resistance to loosening of the threaded members.

What I claim as my invention is:

1. A thread lock construction comprising a body having threads formed thereon provided with two physically separated deposits of fluid components which when reacted together form a solid locking material in the thread grooves at a circumferentially extending zone on said body comprising a plurality of consecutive thread convolutions extending around said body, one of said deposits extending only partly around said body within said zone, the other deposit being located on substantially the same consecutive thread convolutions within said zone and extending around said body in position to bring one of the circumferentially separated edges of said other deposit initially into contact with the adjacent one of the circumferentially separated edges of the said one deposit, said deposits being fluid and capable of being spread and intermixed by engagement with a mating threaded body, a thin barrier of solid material formed by reaction between the two deposits at the initially contacting edges thereof constituting a barrier between said deposits which limits reaction therebetween, a rupturable thin film of dry non-tacky protective material overlying both deposits and barrier, the solid barrier between said zones forming mechanical mixing elements to improve the intermixing of the materials of said deposits when said body is threadedly engaged with a mating threaded body.

2. A construction as defined in claim 1 in which said deposits are respectively a hardenable resin and an activator therefor.

3. A construction as defined in claim 2 in which said resin is epoxy resin.

4. A construction as defined in claim 1 in which the film is a dried deposit of polyvinyl alcohol.

5. A construction as defined in claim 1 in which said one deposit comprises two zones circumferentially spaced apart to define two additional zones therebetween, and the other deposit occupies the said two additional zones.

6. A construction as defined in claim 1 in which the circumferentially separated edges of each of said deposits are located adjacent the circumferentially separated edges of the other deposit and are separated therefrom only by the barriers therebetween.

7. The method of making a thread lock construction which comprises depositing simultaneously in the thread grooves at opposite sides of a threaded portion of a body two physically separated deposits of fluid components which when reacted together form a solid locking material to occupy respectively a first zone extending only partly around the threaded portion but occupying a plurality of consecutive threads and a second zone located circumferentially of said first zone and occupying substantially the same consecutive threads, causing said deposits to flow circumferentially along the threads into contact with each other and to react to form a solid reaction product which forms barriers between the deposits on the first and second zones, and thereafter providing a liquid film-forming coating which when dry forms a non-tacky protective rupturable film covering both parts of said fluid deposits.

8. The method as defined in claim 7 in which the step of providing the protective film comprises applying film-forming material in fluid form without disturbing the deposits of fluid components, and thereafter drying the film-forming material to a dry non-tacky condition.

9. The method as defined in claim 7 in which said components are fluid epoxy resin and a hardener therefor.

10. The method as defined in claim 7 in which said film-forming material is polyvinyl alcohol.

11. The method as defined in claim 7 in which the steps of applying the deposits comprises the steps of advancing a vertically elongated threaded body generally horizontally and applying the fluid components to opposite sides of the threaded portion of said body by wiping the fluid components onto the body over opposed zones of substantial circumferential extent.

12. The method as defined in claim 11 which comprises applying the fluid components with soft rollers disposed in oblique angular relation and having the upper portions of the rollers contact the advancing body and the lower portions thereof each dip into a supply of one of the components.

13. The method as defined in claim 11 which comprises applying the deposit to different thicknesses with a thicker deposit uppermost to provide a more uniform thickness of deposit after limited flow of the deposited material.

14. The method as defined in claim 11, in which the material of the applicators is distortable upon contact with the threaded body to contact a substantial circumferential extent thereof.

* * * * *